Jan. 19, 1943.  R. W. DINZL  2,308,867
INJECTION DEVICE FOR INJECTION MOLDING MACHINES
Filed Sept. 28, 1940
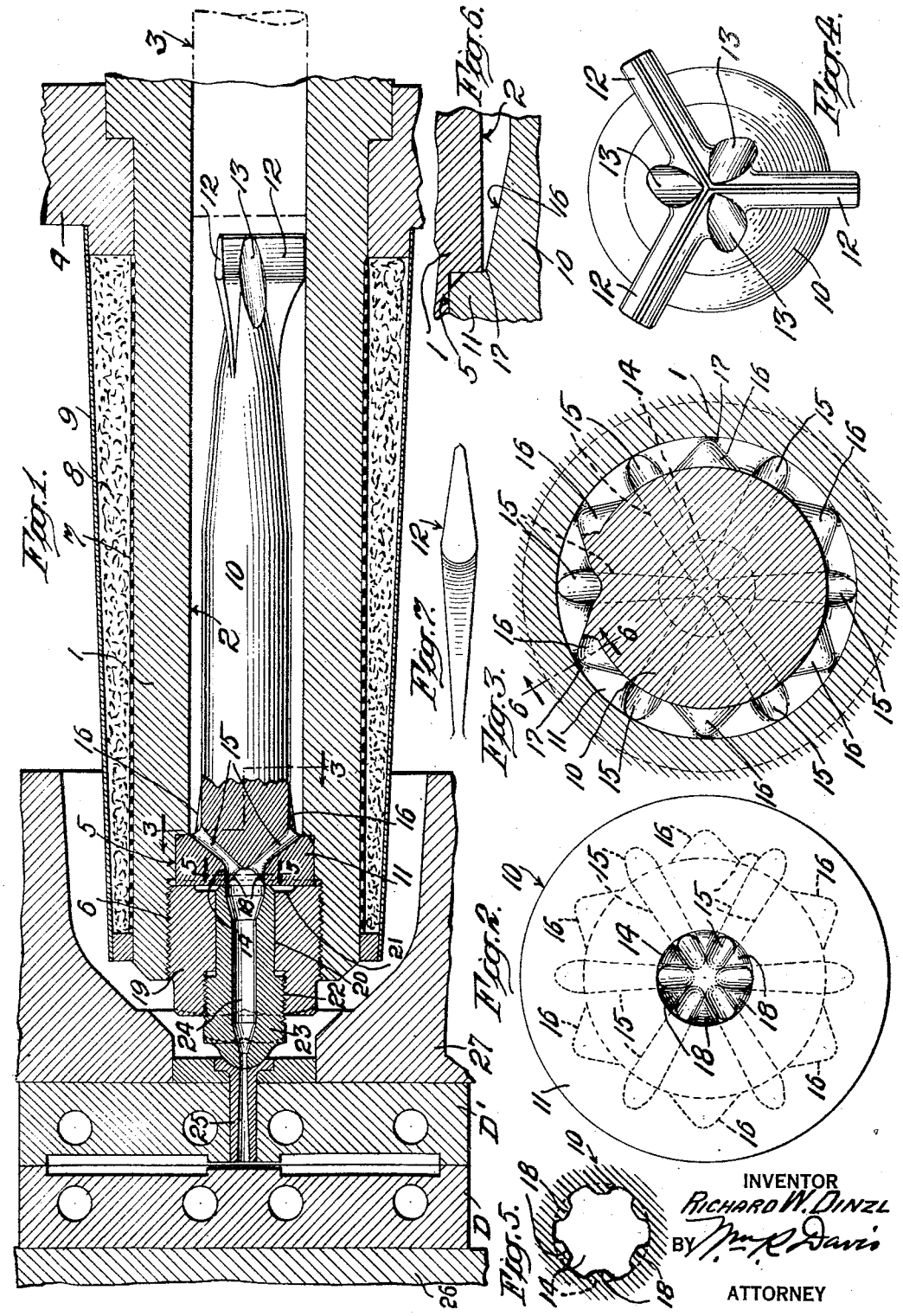
INVENTOR
RICHARD W. DINZL
BY
ATTORNEY Patented Jan. 19, 1943

2,308,867

UNITED STATES PATENT OFFICE 2,308,867

INJECTION DEVICE FOR INJECTION MOLDING MACHINES

Richard W. Dinzl, Westfield, N. J., assignor to The Watson-Stillman Co., Roselle, N. J., a corporation of New Jersey Application September 28, 1940, Serial No. 358,874

1 Claim. (Cl. 18—30)

The present invention relates more particularly to improvements in an injection device for charging a mold with thermoplastic material. Such a device has a cylinder to receive a charge of the material to be molded and the cylinder has an injection nozzle at one end and a plunger reciprocable through its opposite end to force the charge from the cylinder through the nozzle and into a mold gate. Provision is made for heating the cylinder in order to plasticize the charge therein. In order to obtain more uniform heating of the material it is common to employ within the cylinder a torpedo-shaped element which becomes heated along with the cylinder bore and augments the heating area in contact with the material. This element is commonly called a "torpedo." Due to common designs and mountings of such torpedoes there often occur crevices or corners in which bits of the material lodge and become charred. Sometimes these charred bits work loose and become injected into the mold where they cause flaws in the molded product. Such flaws are particularly evident in the molding of a material of a different color from one previously used. When deposits of the previous material in the injector work into the later material of a different color they conspicuously mar the molded articles so that they often have to be discarded.

Important objects of the invention are to provide an improved injection device designed to prevent the said lodging of the molding material therein; to provide a torpedo of improved design for that purpose; and to provide an improved torpedo and nozzle assembly.

Other objects of the invention will appear hereinafter.

In the drawing, Fig. 1 is a longitudinal sectional view of an injection device embodying the invention and associated with molding dies and their supporting platens;

Fig. 2 is an enlarged front end elevation of the torpedo;

Fig. 3 is an enlarged transverse section on the line 3—3 of Fig. 1;

Fig. 4 is an enlarged rear end elevation of the torpedo;

Fig. 5 is an enlarged detail section on the line 5—5 of Fig. 1;

Fig. 6 is a detail section on the line 6—6 of Fig. 3; and

Fig. 7 is an outer edge view of one of the supporting fins at the rear end of the torpedo.

The injector device includes a cylinder 1 having an axial bore 2 to receive the molding material for injection. Through a port in a rear end portion of the cylinder, which portion is broken away in Fig. 1, the material is charged into the cylinder bore. An injection plunger 3, indicated by dot-and-dash lines in Fig. 1, is reciprocable through the rear end of the bore. The cylinder is supported in a fixed position by a part 4 of a molding machine. At its forward end the cylinder has a counterbore including a smooth cylindrical portion 5 next to the bore 2 and a screw-threaded portion 6 opening through said end of the cylinder. The cylinder is surrounded by electrical heating means 7 which is in turn surrounder by heat insulation 8 enclosed by a casing 9.

A torpedo 10 is mounted within the cylinder bore 2 coaxially therewith. The torpedo is formed from a single piece of metal and has an elongated body and an integral cylindrical flange 11 at the forward end of the body and forming an enlarged head with flat forward and rear faces. The body of the torpedo has a cylindrical portion adjacent to said head and a portion tapering from said cylindrical portion to the rear end of the torpedo. Radial fins 12 are formed upon the rear end portion of the torpedo and between said fins said portion is fluted longitudinally, as at 13. In cross section, longitudinally of the torpedo, said fins are streamlined. Each tapers in opposite directions from a middle point, as shown in Fig. 7, and its crest slopes forwardly and inwardly from said point and merges with the periphery of the torpedo. The flutes afford additional clearance for passage of the material between the fins and the form of the fins facilitates said passage.

A discharge port 14 is formed in the forward end of the torpedo. This port is located on the axis of the torpedo, opens through the flat forward face of the head 11 and its depth is materially less than the depth of the head. The torpedo is formed with a series of tapered bores 15 leading from the periphery of the torpedo body, at its juncture with the head, to the port 14. These bores are evenly spaced around the axis of the torpedo and converge forwardly to the port 14. At the rear of the head the torpedo is formed with a series of radially projecting ridges 16 located midway between the entrances of the bores 15. In cross section these ridges are approximately V-shaped and their sides merge with the walls of the adjacent bores. The crests of the ridges slope longitudinally inwardly from the torpedo head and merge at their rear ends with the cylindrical periphery of the torpedo body. At their forward ends the crests are merged with the rear face of the head by a fillet 17, and the crests are rounded in cross section. Within the discharge port 14 the torpedo is formed with a series of ribs 18 located between the exits of the bores 14 and with their crests sloping outward longitudinally to meet the wall of the port.

The head of the torpedo is of a size to fit within the cylindrical portion 5 of the cylinder counterbore and the fins 12 are of a length to all engage the wall of the bore 2. The head and fins thereby support the torpedo centered within the bore 2. The fore-and-aft depth of the head slightly exceeds that of the counterbore portion 5 so that the head protrudes slightly. An externally screw-threaded bushing 19 is screwed into the portion 6 of the counterbore and abuts the forward face of the torpedo head to hold the head tight against the bottom of the counterbore and thereby hold the torpedo against endwise shifting in the cylinder. Said bushing has an axial bore 20 extending between a circular depression 21 in the rear end face of the bushing and a screw-threaded counterbore 22 at the forward end of the bushing. The bushing is of a length to protrude from the cylinder and its protruding end portion has flat sides for engagement by a wrench. A nozzle 23 has a cylindrical shank fitted within the bore 20 and an externally screw-threaded head screwed into the counterbore 22. The nozzle is of a length to protrude forwardly from the bushing, and its protruding portion has flat sides for engagement by a wrench. The bore 24 of the nozzle is enlarged at its rear end to the diameter of the discharge port 14 of the torpedo and is in register with it. At its forward end the nozzle bore is reduced to form a restricted injection port. The nozzle is screwed in so that its rear end abuts the forward face of the torpedo head and effects therewith a tight seal at the connection between the nozzle bore and the torpedo port 14. The nozzle has a rounded forward extremity to fit within a concave entrance to a mold gate 25. A pair of dies D and D' forming the mold which is charged through said gate are shown in Fig. 1 together with portions of platens 26 and 27 for supporting said dies respectively.

Preferably the diameter of the cylindrical portion of the torpedo body is such with relation to the diameter of the cylinder bore 2 that the bore and torpedo define a rather narrow annular space surrounding the torpedo. It is also desirable that the cylindrical portion be of material length. It is preferred that it materially exceed the length of the stroke of the plunger 3. In the long annular space thus provided the molding material can become rapidly and uniformly plasticized by heat from the cylinder and the torpedo.

In the operation of the injection device the plunger 3 is retracted and a charge of thermoplastic material in granular form is admitted to a position in front of the plunger. Then the plunger is advanced to a position near the rear end of the torpedo thereby forcing most of said charge into the long annular space between the torpedo and the wall of the cylinder bore 2. The portion of the charge around the cylindrical portion of the torpedo body becomes uniformly plasticized by the heat and, when another charge of fresh material is forced forward by the plunger, said plasticized portion of the previous charge is expelled through the torpedo bores 15, the torpedo discharge port 14, the nozzle bore and the mold gate into the mold.

The torpedo is designed for free flow of the material along most of its length and through its forward end and the torpedo and its mounting are both designed to prevent lodging of any particles which might char and later work loose and be injected into the mold with consequent marring of the molded product. The cross sectional form of the fins 12 facilitates free passage of the fresh material and the forward end of the torpedo is designed for unobstructed flow of all the plasticized material to the nozzle. The entrances of the torpedo bores 15 extend clear to the wall 2 of the cylinder bore 2, all corners over which the material has to flow to enter the bores 15 and to pass therefrom and through the port 14 to the nozzle bore are rounded and all surfaces over which the material has to pass are smooth. Furthermore, the screw connection between the bushing 19 and the cylinder 1 enables the torpedo head 11 to be forced into tight sealing contact with the bottom of the counterbore of the cylinder and the screw connection between the nozzle and the bushing enables the nozzle to be forced into tight sealing contact with the torpedo. Such seals will confine the material to the proper channels and prevent lodging of particles of the material. The mountings of the torpedo and the nozzle also facilitate their removal for servicing the injector. The nozzle may be unscrewed from the bushing 19 without disturbing the torpedo, and the torpedo may be easily removed by first unscrewing and removing the bushing and then sliding the torpedo forwardly from the cylinder.

What I claim is:

An injection device for charging a mold, comprising an injector body having a bore to receive a charge of material for injection therefrom and a screw-threaded counterbore at the forward end of said bore, a torpedo, for the purpose set forth, having a body extending axially within said bore and an enlarged head at the forward end of the body and fitting within the inner end portion of said counterbore to support the torpedo centered within the bore, an externally and internally screw-threaded bushing screwed into said counterbore to abut the forward face of the torpedo head and hold said head sealed against the bottom of said counterbore, said torpedo having a discharge port located on the torpedo axis and opening through the forward end of the torpedo and forwardly converging bores spaced around the torpedo axis and leading from the periphery of the torpedo body, at its juncture with the head, forwardly and inwardly to said port to conduct material to the latter, the diameter of said port materially exceeding that of the forward ends of said bores opening into the port, and an externally screw-threaded injection nozzle screwed into said bushing with its rear end abutting the margin of said port at the forward end of the torpedo and screw-adjustable relatively to the bushing to effect a seal around the port and with the bore of the nozzle coaxial with the torpedo and enlarged at its rear end to a diameter corresponding to that of said port and contracted at its forward end for discharge into a mold gate.

RICHARD W. DINZL.